US006959219B2

(12) United States Patent
Tanaka

(10) Patent No.: US 6,959,219 B2
(45) Date of Patent: Oct. 25, 2005

(54) CONTROL APPARATUS HAVING A LIMIT CYCLE AUTO-TUNING FUNCTION

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 204 days.

(21) Appl. No.: 10/436,830

(22) Filed: May 13, 2003

(65) Prior Publication Data

US 2003/0216823 A1 Nov. 20, 2003

(30) Foreign Application Priority Data

May 17, 2002 (JP) ........................................ 2002-142631

(51) Int. Cl.$^7$ ............................................. G05B 13/02
(52) U.S. Cl. ............................ 700/33; 700/37; 700/46; 700/55; 702/84; 708/303; 708/322; 318/561
(58) Field of Search ............................... 700/28, 32–37, 700/41, 42, 46, 54, 55, 67, 71; 702/81, 84; 708/300, 303, 309, 311, 322; 318/561, 609, 610

(56) References Cited

U.S. PATENT DOCUMENTS 4,768,066 A * 8/1988 Ito .............................. 355/55
5,059,880 A * 10/1991 Hiroi ........................... 318/610

FOREIGN PATENT DOCUMENTS

JP         05313702 A  * 11/1993  ........... G05B/11/36

OTHER PUBLICATIONS

Hiroi, "Fundamentals and Applications of Digital Instrumentation Control System", Kogyougijutsusha, ISBN4–905957–00–1, pp. 156–159, Oct. 1987.

* cited by examiner

Primary Examiner—Anthony Knight
Assistant Examiner—Crystal J Barnes
(74) Attorney, Agent, or Firm—Blakely Sokoloff Taylor & Zafman

(57) ABSTRACT

A control apparatus includes a manipulated variable output unit, calculation unit, first lower limit setting unit, first upper limit setting unit, second lower limit setting unit, second upper limit setting unit, and controlling element. The manipulated variable output unit outputs first and second manipulated variables to an object to be controlled. The calculation unit calculates a limit cycle auto-tuning control parameter. The controlling element performs feedback control calculation based on the control parameter for the deviation between a set point and a controlled variable to calculate the first manipulated variable, and outputs the calculated first manipulated variable to the object. In executing limit cycle auto-tuning, the calculation unit outputs to the object the second manipulated variable having the second lower limit value as the lower limit value and the second upper limit value as the upper limit value, calculates the control parameter of the controlling element on the basis of a control response corresponding to the manipulated variable output, and sets the calculated control parameter in the controlling element.

9 Claims, 8 Drawing Sheets

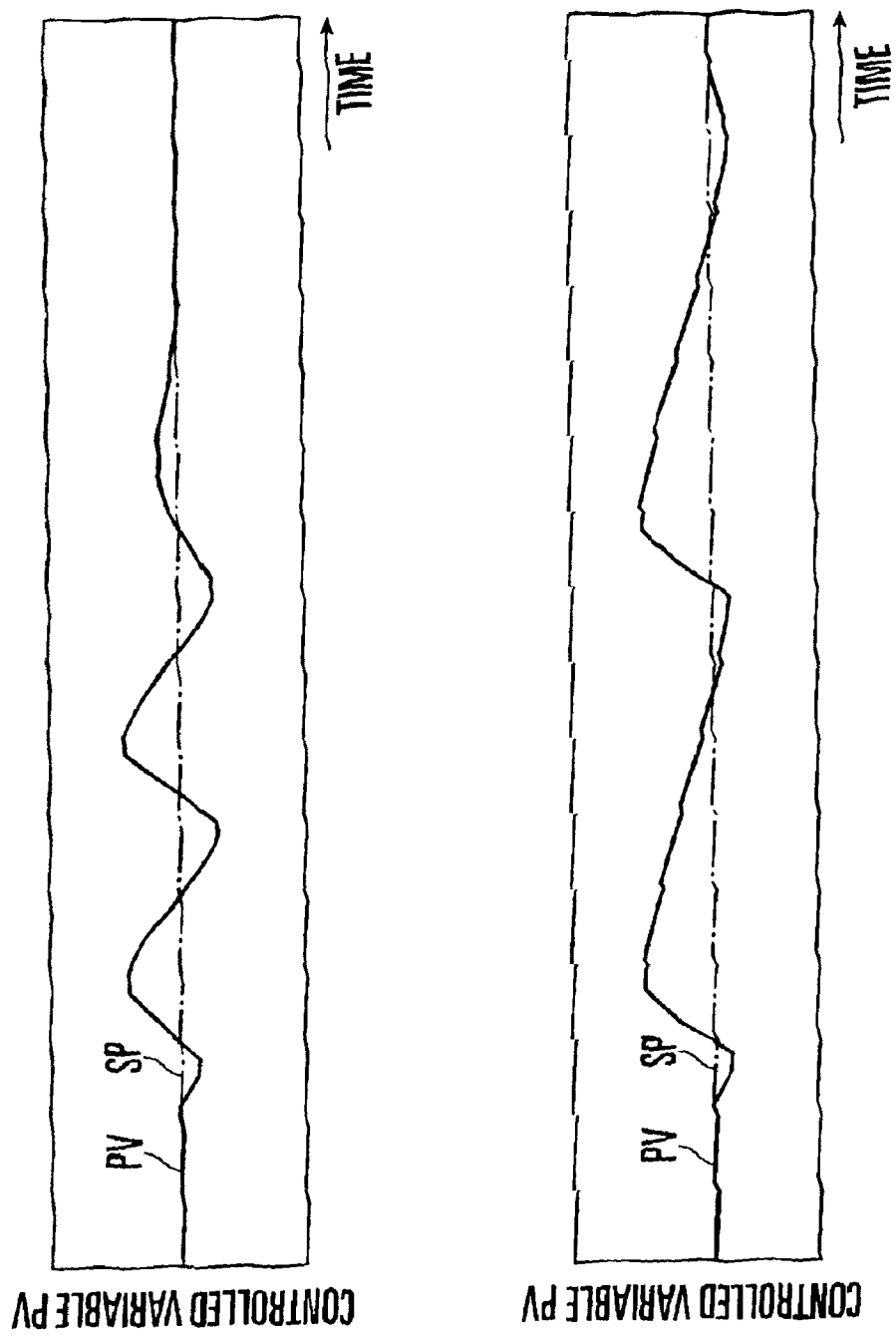

CONTROL APPARATUS HAVING A LIMIT CYCLE AUTO-TUNING FUNCTION

BACKGROUND OF THE INVENTION

The present invention relates to a process control technique and, more particularly, to a control apparatus having a limit cycle auto-tuning function of outputting a manipulated variable with a constant amplitude to an object to be controlled and adjusting a control parameter on the basis of a control response corresponding to the controlled variable output.

A general-purpose temperature controller or the like has an auto-tuning (self-tuning) function in order to easily complete adjustment of PID parameters. A typical method of the auto-tuning function is a limit cycle auto-tuning method of setting upper and lower limit values for a manipulated variable MV to be output to an object to be controlled, generating a limit cycle having a constant manipulated variable amplitude, and adjusting PID parameters (reference: Kazuo Hiroi, "Fundamentals and Applications of Digital Instrumentation Control System", Kogyougijutsusha, ISBN4-905957-00-1, pp. 156–159, October 1987).

An example of limit cycle auto-tuning will be described. First of all, a manipulated variable lower limit set point OL_AT which designates the lower limit value of the manipulated variable MV to be output to an object to be controlled in executing limit cycle auto-tuning, and a manipulated variable upper limit set point OH_AT which designates the upper limit value of the manipulated variable MV are set in advance.

In executing limit cycle auto-tuning, a controlled variable PV and set point SP are compared (step S401 in FIG. 7). If the controlled variable PV is larger than the set point SP, the lower limit value OL_AT of the manipulated variable MV is output to the object (step S402). If the controlled variable PV is equal to or smaller than the set point SP, the upper limit value OH_AT of the manipulated variable MV is output to the object (step S403).

Extreme value increment/decrement detection processing of detecting the extreme value of the controlled variable PV is performed (step S404). Processes in steps S401 to S404 are performed every control cycle. If four extreme values of the controlled variable PV are detected, detection ends. A deviation Er between the set point SP and the controlled variable PV is given by $$Er = SP - PV \quad (1)$$

As shown in FIG. 6, a first extreme value deviation Er1 represents a deviation in the latest extreme value out of four detected extreme values; a second extreme value deviation Er2, a deviation in the second latest extreme value; and a third extreme value deviation Er3, a deviation in the third latest extreme value.

A first manipulated variable switching elapsed-time Th1 is a time interval between time t5 at which the sign of the deviation Er is reversed immediately before the first extreme value deviation Er1, and time t6 at which the first extreme value deviation Er1 is obtained. A second manipulated variable switching elapsed-time Th2 is a time interval between time t3 at which the sign of the deviation Er is reversed immediately before the second extreme value deviation Er2, and time t4 at which the second extreme value deviation Er2 is obtained.

PID parameters including a proportional band Pb, integral time Ti, and derivative time Td are calculated by equations (2) to (4). The calculated PID parameters are set in the controlling element of the control apparatus (step S405).

$$Pb = 250 |Er2 - Er1| / (OH\_AT - OL\_AT) \quad (2)$$

$$Ti = 6(Th1 + Th2) \quad (3)$$

$$Td = 1.2(Th1 + Th2) \quad (4)$$

Thereafter, limit cycle auto-tuning ends.

Some general-purpose temperature controllers directly use an upper limit set point OH and lower limit set point OL of the manipulated variable MV that are output to an object to be controlled during actual control, as the manipulated variable upper limit set point OH_AT and manipulated variable lower limit set point OL_AT which are used to execute limit cycle auto-tuning. In general, OH=100% and OL=0%. In auto-tuning, therefore, the manipulated variable upper limit set point OH_AT=100%, and the manipulated variable lower limit set point OL_AT=0%.

For a heat-insulating object to be controlled, the manipulated variable MV necessary to maintain the controlled variable PV around the set point SP is as low as MV=20% or less. In this situation, if auto-tuning at MV=0% to 100% is executed with the setting of OH_AT=100%, the temperature rises quickly and drops slowly (the object is hardly cooled because of a high heating insulating property). Compared to the case of FIG. 8A in which limit cycle auto-tuning is properly executed, the limit cycle takes a long time, as shown in FIG. 8B.

In conventional limit cycle auto-tuning, it is also possible to change the manipulated variable upper limit set point OH and manipulated variable lower limit set point OL to proper values, and execute auto-tuning. If, however, the manipulated variable upper limit set point OH and manipulated variable lower limit set point OL are changed in executing auto-tuning, they must be reset at the end of auto-tuning.

In particular, an object to be controlled which must be frequently auto-tuned by the operator on site frequently requires cumbersome setting operation, greatly decreasing the workability.

The manipulated variable upper limit set point OH and manipulated variable lower limit set point OL are not always set to OH=100% and OL=0%, and may be set to other values. In the worst case, the operator on site may set the manipulated variable upper limit set point OH_AT used to execute limit cycle auto-tuning to be higher than the manipulated variable upper limit set point OH during actual control and the manipulated variable lower limit set point OL_AT used to execute limit cycle auto-tuning to be lower than the manipulated variable lower limit set point OL during actual control. To the contrary, the operator may erroneously set the manipulated variable upper limit set point OH and manipulated variable lower limit set point OL in resetting them.

SUMMARY OF THE INVENTION

It is an object of the present invention to provide a control apparatus which can independently set the upper and lower limit values of a manipulated variable output to an object to be controlled in normal control operation, and the upper and lower limit values of a manipulated variable output to the object in executing limit cycle auto-tuning, and does not request any cumbersome setting operation of the operator on site.

It is another object of the present invention to provide a control apparatus in which the upper and lower limit values of a manipulated variable output to an object to be controlled in executing limit cycle auto-tuning do not deviate from the upper and lower limit values of a manipulated variable output to the object in normal control operation.

To achieve the above objects, according to the present invention, there is provided a control apparatus comprising manipulated variable output means for outputting first and second manipulated variables having a constant amplitude to an object to be controlled, the first manipulated variable being output to the object in normal operation and the second manipulated variable being output to the object in executing limit cycle auto-tuning, arithmetic means for calculating a limit cycle auto-tuning control parameter for adjusting a control parameter to the object on the basis of a control response corresponding to the first and second manipulated variables from the manipulated variable output means, first lower limit setting means for setting in advance a first lower limit value representing a lower limit value of the first manipulated variable, first upper limit setting means for setting in advance a first upper limit value representing an upper limit value of the first manipulated variable, second lower limit setting means for setting in advance a second lower limit value representing a lower limit value of the second manipulated variable, second upper limit setting means for setting in advance a second upper limit value representing an upper limit value of the second manipulated variable, and controlling means for performing feedback control calculation based on the control parameter for a deviation between a set point and a controlled variable to calculate the first manipulated variable, and outputting the calculated first manipulated variable to the object, wherein in executing limit cycle auto-tuning, the arithmetic means outputs to the object the second manipulated variable having the second lower limit value as the lower limit value and the second upper limit value as the upper limit value, calculates the control parameter of the controlling means on the basis of a control response corresponding to the manipulated variable output, and sets the calculated control parameter in the controlling means.

BRIEF DESCRIPTION OF THE DRAWINGS

FIGS. 8A and 8B are waveform charts for explaining the problem of conventional limit cycle auto-tuning.

DESCRIPTION OF THE PREFERRED EMBODIMENTS

[First Embodiment]

Figure 1:
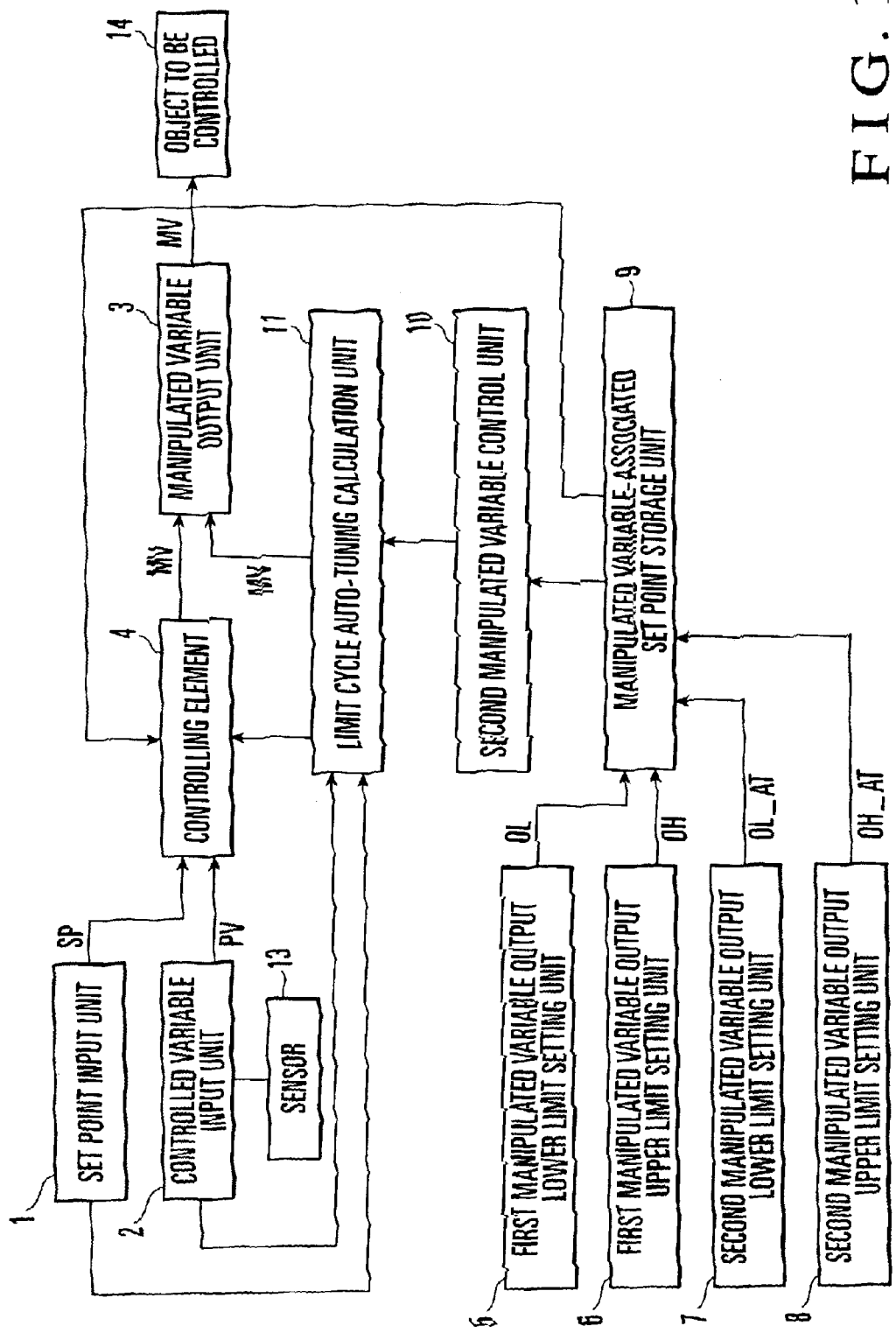
FIG. 1 is a block diagram showing the arrangement of a control apparatus according to the first embodiment of the present invention.

The first embodiment of the present invention will be described in detail below with reference to the accompanying drawings.

A control apparatus according to the first embodiment comprises a set point input unit 1 which inputs a set point SP, a controlled variable input unit 2 which is connected to a sensor 13 and inputs a controlled variable PV, a controlling element 4 which is connected to the set point input unit 1 and controlled variable input unit 2 and performs feedback control calculation based on control parameters for the deviation between the set point SP and the controlled variable PV, and a manipulated variable output unit 3 which is connected to the controlling element 4 and an object 14 to be controlled and outputs a manipulated variable MV.

The control apparatus further comprises a first manipulated variable output lower limit setting unit 5 which sets a first manipulated variable lower limit set point OL in advance, a first manipulated variable output upper limit setting unit 6 which sets a first manipulated variable upper limit set point OH in advance, a second manipulated variable output lower limit setting unit 7 which sets a second manipulated variable lower limit set point OL_AT in advance, and a second manipulated variable output upper limit setting unit 8 which sets a second manipulated variable upper limit set point OH_AT in advance.

The set point input unit 1 inputs the set point SP set by the operator of the control apparatus. The controlled variable input unit 2 inputs the controlled variable PV detected by the sensor 13. The manipulated variable output unit 3 outputs the manipulated variable MV to the object 14 to be controlled.

In normal operation, the controlling element 4 performs feedback control calculation based on control parameters for the deviation between the set point SP and the controlled variable PV, and calculates the first manipulated variable.

The first manipulated variable output lower limit setting unit 5 sets in advance the manipulated variable lower limit set point OL which designates the lower limit value of the first manipulated variable to be output to an object in normal operation. The first manipulated variable output upper limit setting unit 6 sets in advance the first manipulated variable upper limit set point OH which designates the upper limit value of the first manipulated variable.

The second manipulated variable output lower limit setting unit 7 sets in advance the second manipulated variable lower limit set point OL_AT which designates the lower limit value of the second manipulated variable to be output to an object in executing limit cycle auto-tuning. The second manipulated variable output upper limit setting unit 8 sets in advance the second manipulated variable upper limit set point OH_AT which designates the upper limit value of the second manipulated variable.

The control apparatus further comprises a manipulated variable-associated set point storage unit 9 which is connected to the first manipulated variable output lower limit setting unit 5, first manipulated variable output upper limit setting unit 6, second manipulated variable output lower limit setting unit 7, second manipulated variable output upper limit setting unit 8, and controlling element 4 and stores set points, a second manipulated variable control unit 10 which is connected to the manipulated variable-associated set point storage unit 9 and sets the lower and upper limit values of the second manipulated variable, and a limit cycle auto-tuning calculation unit 11 which is connected to the set point input unit 1, controlled variable input unit 2, controlling element 4, manipulated variable output unit 3, and second manipulated variable control unit 10 and calculates control parameters.

The manipulated variable-associated set point storage unit 9 stores the first manipulated variable lower limit set point OL, first manipulated variable upper limit set point OH, second manipulated variable lower limit set point OL_AT, and second manipulated variable upper limit set point OH_AT. In executing limit cycle auto-tuning, the second manipulated variable control unit 10 refers to set points stored in the manipulated variable-associated set point storage unit 9. If the second manipulated variable lower limit set point OL_AT is lower than the first manipulated variable lower limit set point OL, the second manipulated variable control unit 10 sets the first manipulated variable lower limit set point OL as the lower limit value of the second manipulated variable instead of the second manipulated variable lower limit set point OL_AT.

In executing limit cycle auto-tuning, the second manipulated variable control unit 10 refers to set points stored in the manipulated variable-associated set point storage unit 9. If the second manipulated variable upper limit set point OH_AT is higher than the first manipulated variable upper limit set point OH, the second manipulated variable control unit 10 sets the first manipulated variable upper limit set point OH as the upper limit value of the second manipulated variable instead of the second manipulated variable upper limit set point OH_AT.

The limit cycle auto-tuning calculation unit 11 executes a limit cycle auto-tuning processing sequence, outputs the second manipulated variable to an object to be controlled, and calculates the control parameters of the controlling element 4 on the basis of a control response corresponding to the manipulated variable output.

The limit cycle auto-tuning function of the control apparatus will be described with reference to FIG. 2.

The set point SP is set by the operator of the control apparatus, and input to the controlling element 4 and limit cycle auto-tuning calculation unit 11 via the set point input unit 1. The controlled variable PV is detected by the sensor 13, and input to the controlling element 4 and limit cycle auto-tuning calculation unit 11 via the controlled variable input unit 2.

The first manipulated variable lower limit set point OL which designates the lower limit value of the manipulated variable MV output to the object 14 during control is set by the operator in advance, and stored in the manipulated variable-associated set point storage unit 9 via the first manipulated variable output lower limit setting unit 5. Similarly, the first manipulated variable upper limit set point OH which designates the upper limit value of the manipulated variable MV output to the object during control is set by the operator in advance, and stored in the manipulated variable-associated set point storage unit 9 via the first manipulated variable output upper limit setting unit 6.

The second manipulated variable lower limit set point OL_AT which designates the lower limit value of the manipulated variable MV output to the object in executing limit cycle auto-tuning is set by the operator in advance. The set second manipulated variable lower limit set point OL_AT is stored in the manipulated variable-associated set point storage unit 9 via the second manipulated variable output lower limit setting unit 7.

The second manipulated variable upper limit set point OH_AT which designates the upper limit value of the manipulated variable MV output to the object in executing limit cycle auto-tuning is set by the operator in advance. The set second manipulated variable upper limit set point OH_AT is stored in the manipulated variable-associated set point storage unit 9 via the second manipulated variable output upper limit setting unit 8.

Figure 2:
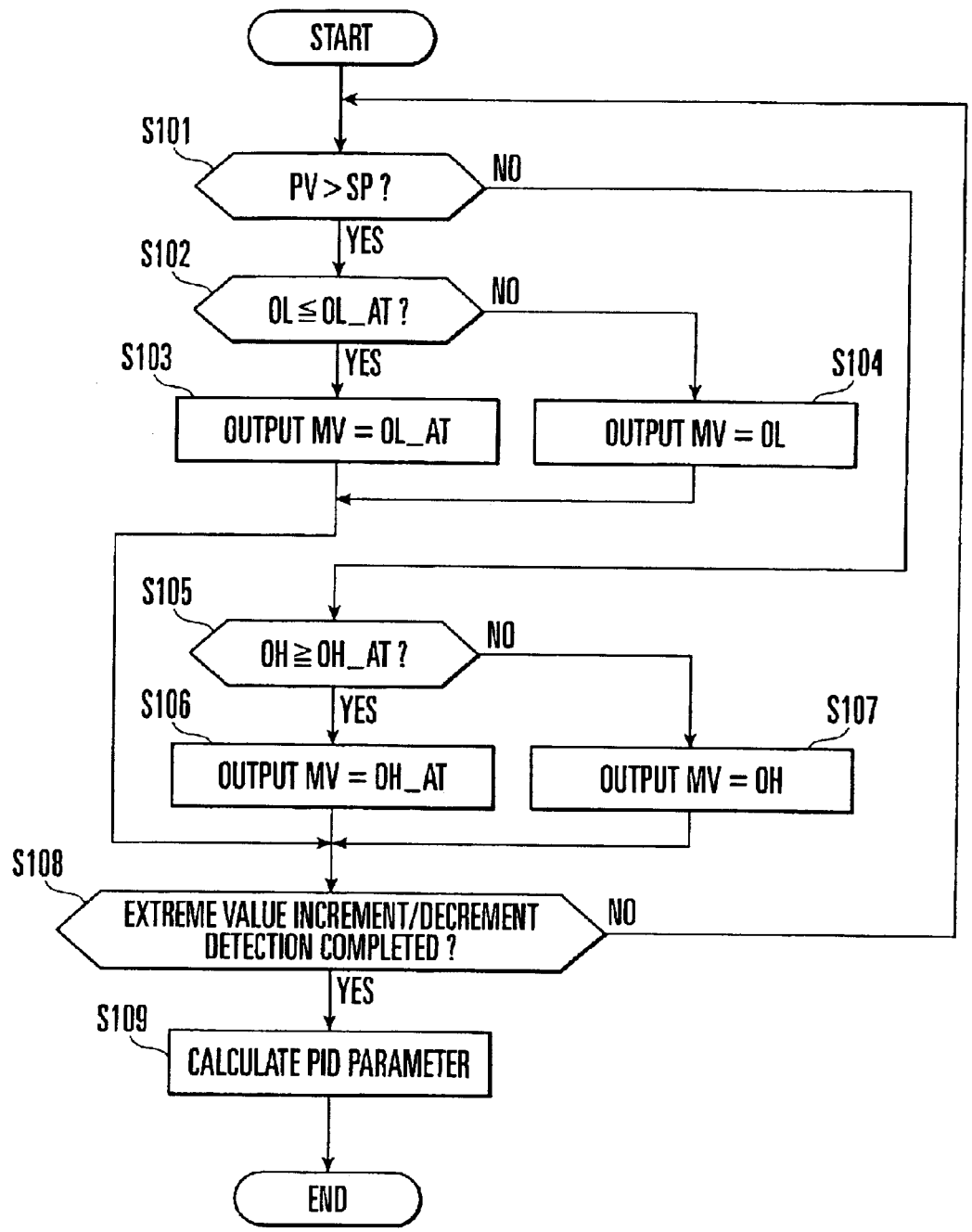
FIG. 2 is a flow chart showing the operation of the control apparatus in FIG. 1 in executing limit cycle auto-tuning.

The limit cycle auto-tuning calculation unit 11 compares the controlled variable PV and set point SP in executing limit cycle auto-tuning (step S101 of FIG. 2).

If the controlled variable PV is higher than the set point SP as a result of comparison between the controlled variable PV and the set point SP, the limit cycle auto-tuning calculation unit 11 outputs to the manipulated variable output unit 3 the lower limit value of the manipulated variable MV which is decided by the second manipulated variable control unit 10. If the controlled variable PV is equal to or smaller than the set point SP as a result of comparison between the controlled variable PV and the set point SP, the limit cycle auto-tuning calculation unit 11 outputs to the manipulated variable output unit 3 the upper limit value of the manipulated variable MV which is decided by the second manipulated variable control unit 10.

If the first manipulated variable lower limit set point OL stored in the manipulated variable-associated set point storage unit 9 is equal to or lower than the second manipulated variable lower limit set point OL_AT stored in the manipulated variable-associated set point storage unit 9 (YES in step S102), the second manipulated variable control unit 10 adopts the second manipulated variable lower limit set point OL_AT as the lower limit value of the manipulated variable MV.

If the controlled variable PV is larger than the set point SP and the first manipulated variable lower limit set point OL is equal to or lower than the second manipulated variable lower limit set point OL_AT, the limit cycle auto-tuning calculation unit 11 outputs to the manipulated variable output unit 3 the manipulated variable MV=OL_AT which is decided by the second manipulated variable control unit 10 because the second manipulated variable lower limit set point OL_AT is adopted as the lower limit value of the manipulated variable MV. The manipulated variable output unit 3 outputs the input manipulated variable MV to an object to be controlled (step S103).

If the first manipulated variable lower limit set point OL is higher than the second manipulated variable lower limit set point OL_AT (NO in step S102), the second manipulated variable control unit 10 adopts the first manipulated variable lower limit set point OL as the lower limit value of the manipulated variable MV.

If the controlled variable PV is larger than the set point SP and the first manipulated variable lower limit set point OL is higher than the second manipulated variable lower limit set point OL_AT, the limit cycle auto-tuning calculation unit 11 outputs to the manipulated variable output unit 3 the manipulated variable MV=OL which is decided by the second manipulated variable control unit 10 because the first manipulated variable lower limit set point OL is adopted as the lower limit value of the manipulated variable MV. The manipulated variable output unit 3 outputs the input manipulated variable MV to the object (step S104).

If the first manipulated variable upper limit set point OH stored in the manipulated variable-associated set point storage unit 9 is equal to or higher than the second manipulated variable upper limit set point OH_AT stored in the manipulated variable-associated set point storage unit 9 (YES in step S105), the second manipulated variable control unit 10 adopts the second manipulated variable upper limit set point OH_AT as the upper limit value of the manipulated variable MV.

If the controlled variable PV is equal to or smaller than the set point SP and the first manipulated variable upper limit set point OH is equal to or higher than the second manipulated variable upper limit set point OH_AT, the limit cycle auto-tuning calculation unit 11 outputs to the manipulated variable output unit 3 the manipulated variable MV=OH_AT which is decided by the second manipulated variable control unit 10 because the second manipulated variable upper limit set point OH_AT is adopted as the upper limit value of the manipulated variable MV. The manipulated variable output unit 3 outputs the input manipulated variable MV to the object (step S106).

If the first manipulated variable upper limit set point OH is lower than the second manipulated variable upper limit set point OH_AT (NO in step S105), the second manipulated variable control unit 10 adopts the first manipulated variable upper limit set point OH as the upper limit value of the manipulated variable MV.

If the controlled variable PV is equal to or smaller than the set point SP and the first manipulated variable upper limit set point OH is lower than the second manipulated variable lower limit set point OH_AT, the limit cycle auto-tuning calculation unit 11 outputs to the manipulated variable output unit 3 the manipulated variable MV=OH which is decided by the second manipulated variable control unit 10 because the first manipulated variable upper limit set point OH is adopted as the upper limit value of the manipulated variable MV. The manipulated variable output unit 3 outputs the input manipulated variable MV to the object (step S107).

The limit cycle auto-tuning calculation unit 11 then performs extreme value increment/decrement detection processing (step S108). The control response in limit cycle auto-tuning is the same as the conventional one, and extreme value increment/decrement detection processing will be explained with reference to FIGS. 3 and 6.

Figure 3:
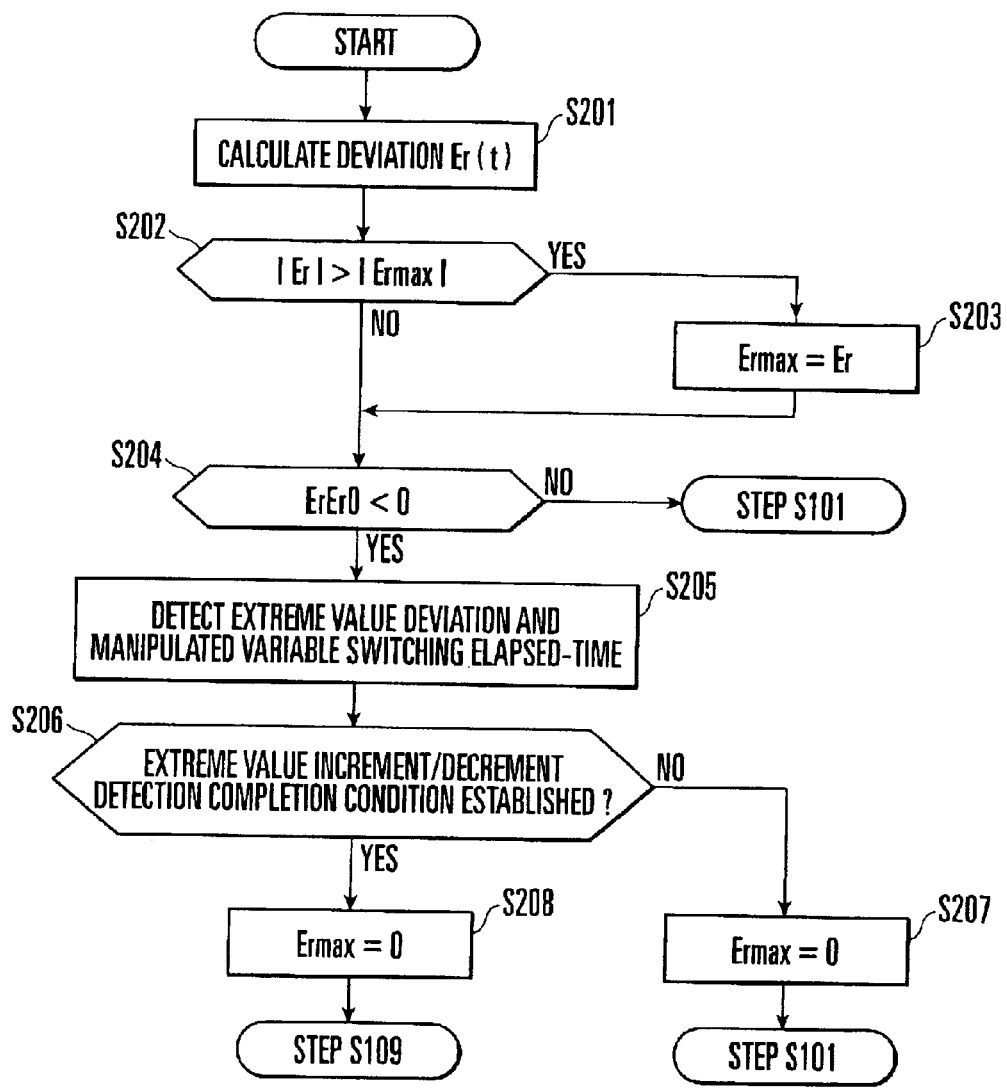
FIG. 3 is a flow chart showing extreme value increment/decrement detection processing of a limit cycle auto-tuning calculation unit in FIG. 1.

The limit cycle auto-tuning calculation unit 11 calculates a deviation Er of the current control cycle on the basis of the set point SP and controlled variable PV in accordance with equation (1) (step S201 of FIG. 3). The limit cycle auto-tuning calculation unit 11 determines whether inequality (5) is established (step S202):

$$|Er| > |Ermax| \quad (5)$$

where Ermax is the maximum value of the deviation and its default value is 0. If inequality (5) is established, the limit cycle auto-tuning calculation unit 11 sets Ermax=Er, i.e., sets the deviation Er of the current control cycle as the maximum deviation Ermax (step S203).

The limit cycle auto-tuning calculation unit 11 determines whether the sign of the deviation Er has been reversed (step S204):

$$ErEr0 < 0 \quad (6)$$

where Er0 is the deviation of a preceding control cycle. Inequality (6) is used to determine that the sign of the deviation Er has been reversed when the product of the current deviation Er and the deviation Er0 of the preceding control cycle is negative. If inequality (6) is not established, the limit cycle auto-tuning calculation unit 11 determines that extreme value increment/decrement detection has not been completed, and returns to step S101.

Processes in steps S101 to S107 and S108 (steps S201 to S204) are repeated every control cycle. As the deviation Er increases, the maximum deviation Ermax is updated. At time t1 in FIG. 6, inequality (6) is established.

If inequality (6) is established, the limit cycle auto-tuning calculation unit 11 sets Er1 =Ermax, i.e., sets the maximum deviation Ermax as the first extreme value deviation Er1. The limit cycle auto-tuning calculation unit 11 sets, as a first manipulated variable switching elapsed-time Th1, a time interval between time at which inequality (6) has been established before and the latest time at which the maximum deviation Ermax has been updated (step S205). If inequality (6) is established for the first time, the limit cycle auto-tuning calculation unit 11 sets the first manipulated variable switching elapsed-time Th1 to 0.

The limit cycle auto-tuning calculation unit 11 determines whether an extreme value increment/decrement detection completion condition is established (step S206). In the first embodiment, the extreme value increment/decrement detection completion condition is detection of four extreme values of the controlled variable PV. In this case, only one extreme value of the controlled variable PV has been detected. The limit cycle auto-tuning calculation unit 11 determines that extreme value increment/decrement detection has not been completed, initializes the maximum deviation Ermax to 0 (step S207), and returns to step S101.

Processes in steps S101 to S107 and S108 (steps S201 to S204) are repeated every control cycle. At time t3 in FIG. 6, inequality (6) is established again. If inequality (6) is established, the limit cycle auto-tuning calculation unit 11 sets Er2=Er1 Er1=Ermax, and Th2=Th1, i.e., substitutes the value of the first extreme value deviation Er1 into the second extreme value deviation Er2.

The limit cycle auto-tuning calculation unit 11 sets the maximum deviation Ermax as a new first extreme value deviation Er1, and substitutes the value of the first manipulated variable switching elapsed-time Th1 into the second manipulated variable switching elapsed-time Th2.

The limit cycle auto-tuning calculation unit 11 sets, as a new first manipulated variable switching elapsed-time Th1, a time interval between time t1 at which inequality (6) has been established before and the latest time t2 at which the maximum deviation Ermax has been updated (step S205).

The limit cycle auto-tuning calculation unit 11 determines whether the extreme value increment/decrement detection completion condition is established (step S206). In this case, only two extreme values of the controlled variable PV have been detected. The limit cycle auto-tuning calculation unit 11 determines that extreme value increment/decrement detection has not been completed, initializes the maximum deviation Ermax to 0 (step S207), and returns to step S101.

Processes in steps S101 to S107 and S108 (steps S201 to S204) are repeated every control cycle. At time t5 in FIG. 6, inequality (6) is established again. If inequality (6) is established, the limit cycle auto-tuning calculation unit 11 sets Er3=Er2, Er2=Er1, Er1=Ermax, and Th2=Th1, i.e., substitutes the value of the second extreme value deviation Er2 into the third extreme value deviation Er3.

The limit cycle auto-tuning calculation unit 11 substitutes the value of the first extreme value deviation Er1 into the second extreme value deviation Er2, sets the maximum deviation Ermax as a new first extreme value deviation Er1, and substitutes the value of the first manipulated variable switching elapsed-time Th1 into the second manipulated variable switching elapsed-time Th2. The limit cycle auto-tuning calculation unit 11 sets, as a new first manipulated variable switching elapsed-time Th1, a time interval between time t3 at which inequality (6) has been established before and the latest time t4 at which the maximum deviation Ermax has been updated (step S205).

The limit cycle auto-tuning calculation unit 11 determines whether the extreme value increment/decrement detection completion condition is established (step S206). In this case, only three extreme values of the controlled variable PV have been detected. The limit cycle auto-tuning calculation unit 11 determines that extreme value increment/decrement detection has not been completed, initializes the maximum deviation Ermax to 0 (step S207), and returns to step S101.

Processes in steps S101 to S107 and S108 (steps S201 to S204) are repeated every control cycle. At time t7 in FIG. 6, inequality (6) is established again.

If inequality (6) is established, the limit cycle auto-tuning calculation unit 11 sets Er3=Er2, Er2=Er1, Er1=Ermax, and Th2=Th1. The limit cycle auto-tuning calculation unit 11 sets, as a new first manipulated variable switching elapsed-time Th1, a time interval between time t5 at which inequality (6) has been established before and the latest time t6 at which the maximum deviation Ermax has been updated (step S205).

The limit cycle auto-tuning calculation unit 11 determines whether the extreme value increment/decrement detection completion condition is established (step S206). In this case, four extreme values of the controlled variable PV have been detected. The limit cycle auto-tuning calculation unit 11 determines that extreme value increment/decrement detection has been completed, initializes the maximum deviation Ermax to 0 (step S207), and returns to step S109.

Figure 6:
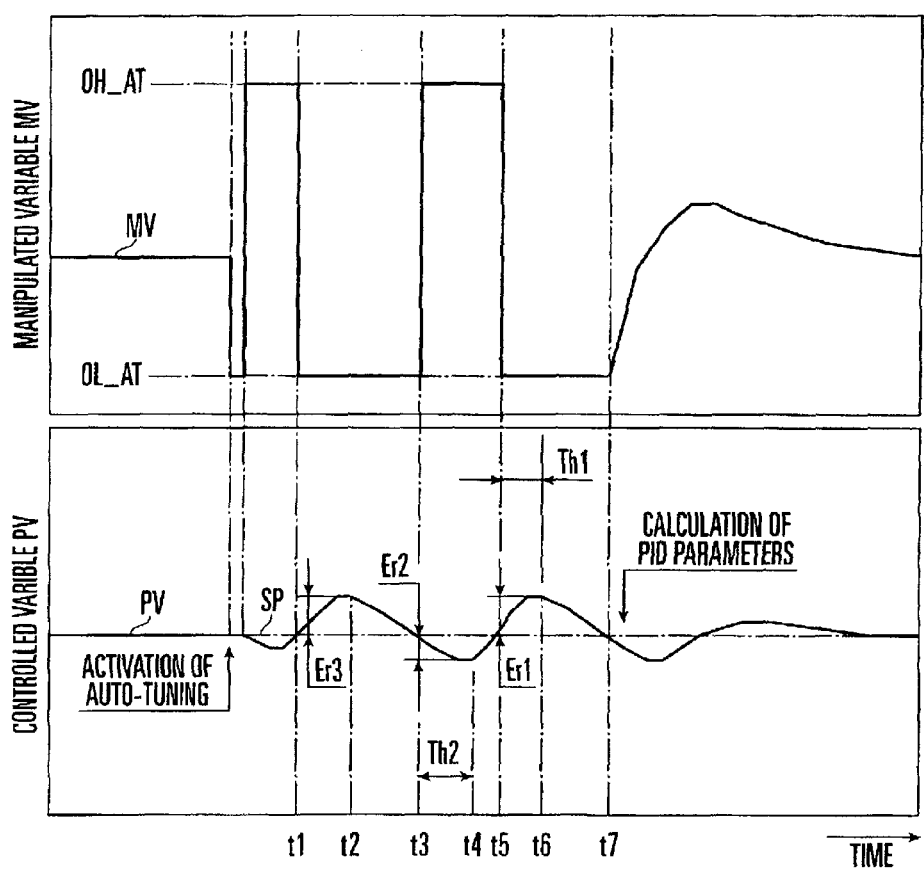
FIG. 6 is a waveform chart for explaining conventional limit cycle auto-tuning.
Figure 7:
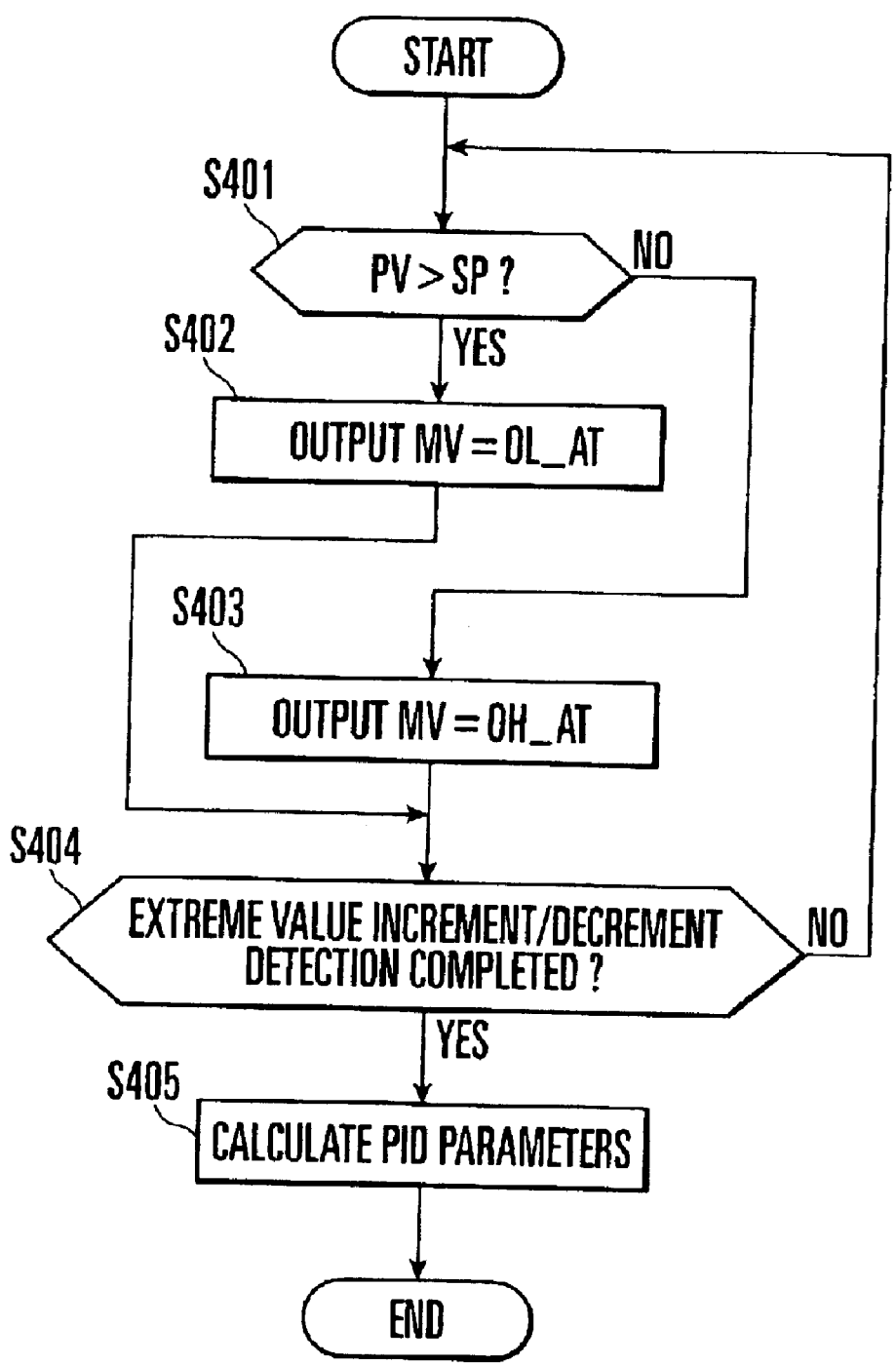
FIG. 7 is a flow chart showing a conventional limit cycle auto-tuning processing flow.

As is apparent from FIG. 6, calculation of PID parameters originally requires three extreme values of the controlled variable PV. The first extreme value may be improper for parameter calculation, and thus four extreme values of the controlled variable PV are detected.

After the completion of extreme value increment/decrement detection, the limit cycle auto-tuning calculation unit 11 calculates the control parameters (PID parameters in the first embodiment) of the controlling element 4 (step S109). If the first manipulated variable lower limit set point OL is equal to or lower than the second manipulated variable lower limit set point OL_AT and the first manipulated variable upper limit set point OH is equal to or higher than the second manipulated variable upper limit set point OH_AT, the limit cycle auto-tuning calculation unit 11 calculates a proportional band Pb by equation (2) described above.

If the first manipulated variable lower limit set point OL is higher than the second manipulated variable lower limit set point OL_AT and the first manipulated variable upper limit set point OH is equal to or higher than the second manipulated variable upper limit set point OH_AT, the limit cycle auto-tuning calculation unit 11 calculates the proportional band Pb:

$$Pb=250|Er2-Er1|/(OH\_AT-OL) \quad (7)$$

If the first manipulated variable lower limit set point OL is equal to or lower than the second manipulated variable lower limit set point OL_AT and the first manipulated variable upper limit set point OH is lower than the second manipulated variable upper limit set point OH_AT, the limit cycle auto-tuning calculation unit 11 calculates the proportional band Pb:

$$Pb=250|Er2-Er1|/(OH-OL\_AT) \quad (8)$$

If the first manipulated variable lower limit set point OL is higher than the second manipulated variable lower limit set point OL_AT and the first manipulated variable upper limit set point OH is lower than the second manipulated variable upper limit set point OH_AT, the limit cycle auto-tuning calculation unit 11 calculates the proportional band Pb:

$$Pb=250|Er2-Er1|/(OH-OL) \quad (9)$$

The limit cycle auto-tuning calculation unit 11 calculates an integral time Ti and derivative time Td in accordance with equations (3) and (4) described above. The limit cycle auto-tuning calculation unit 11 sets the calculated proportional band Pb, integral time Ti, and derivative time Td in the controlling element 4. As a result, PID parameter calculation processing and limit cycle auto-tuning end.

In normal control operation after limit cycle auto-tuning, the controlling element 4 calculates the manipulated variable MV every control cycle by performing feedback control calculation by the following transfer function using a Laplace operator on the basis of the set point SP input from the set point input unit 1 and the controlled variable PV input from the controlled variable input unit 2. That is, the controlling element 4 calculates the manipulated variable MV so as to make the controlled variable PV coincide with the set point SP.

$$MV=(\alpha/Pb)\{1+(1/Tis)+Tds\}(SP-PV) \quad (10)$$

where α is a constant of, e.g., 100. The manipulated variable MV calculated by the controlling element 4 is output to the object via the manipulated variable output unit 3. If the calculated manipulated variable MV is smaller than the first manipulated variable lower limit set point OL, the controlling element 4 outputs the manipulated variable MV=OL to the manipulated variable output unit 3.

If the calculated manipulated variable MV is larger than the first manipulated variable upper limit set point OH, the controlling element 4 outputs the manipulated variable MV=OH to the manipulated variable output unit 3.

As described above, according to the first embodiment, the operator can set the second manipulated variable lower limit set point OL_AT and second manipulated variable upper limit set point OH_AT used to execute auto-tuning, separately from the first manipulated variable lower limit set point OL and first manipulated variable upper limit set point OH used during actual control.

In the first embodiment, the second manipulated variable in auto-tuning is prevented from deviating from the first manipulated variable lower limit set point OL or first manipulated variable upper limit set point OH. In other words, for OL>OL_AT, the first manipulated variable lower limit set point OL is employed as the lower limit value of the second manipulated variable instead of the second manipulated variable lower limit set point OL_AT.

If the second manipulated variable in auto-tuning is OH<OH_AT, the first manipulated variable upper limit set point OH is employed as the upper limit value of the second manipulated variable instead of the second manipulated variable upper limit set point OH_AT.

With this setting, the first embodiment enables auto-tuning using a proper second manipulated variable, and the operator on site need not frequently change settings. Further, the second manipulated variable in auto-tuning does not deviate from the first manipulated variable lower limit set point OL and first manipulated variable upper limit set point OH serving as the upper and lower limits of the basic manipulated variable.

[Second Embodiment]

Figure 4:
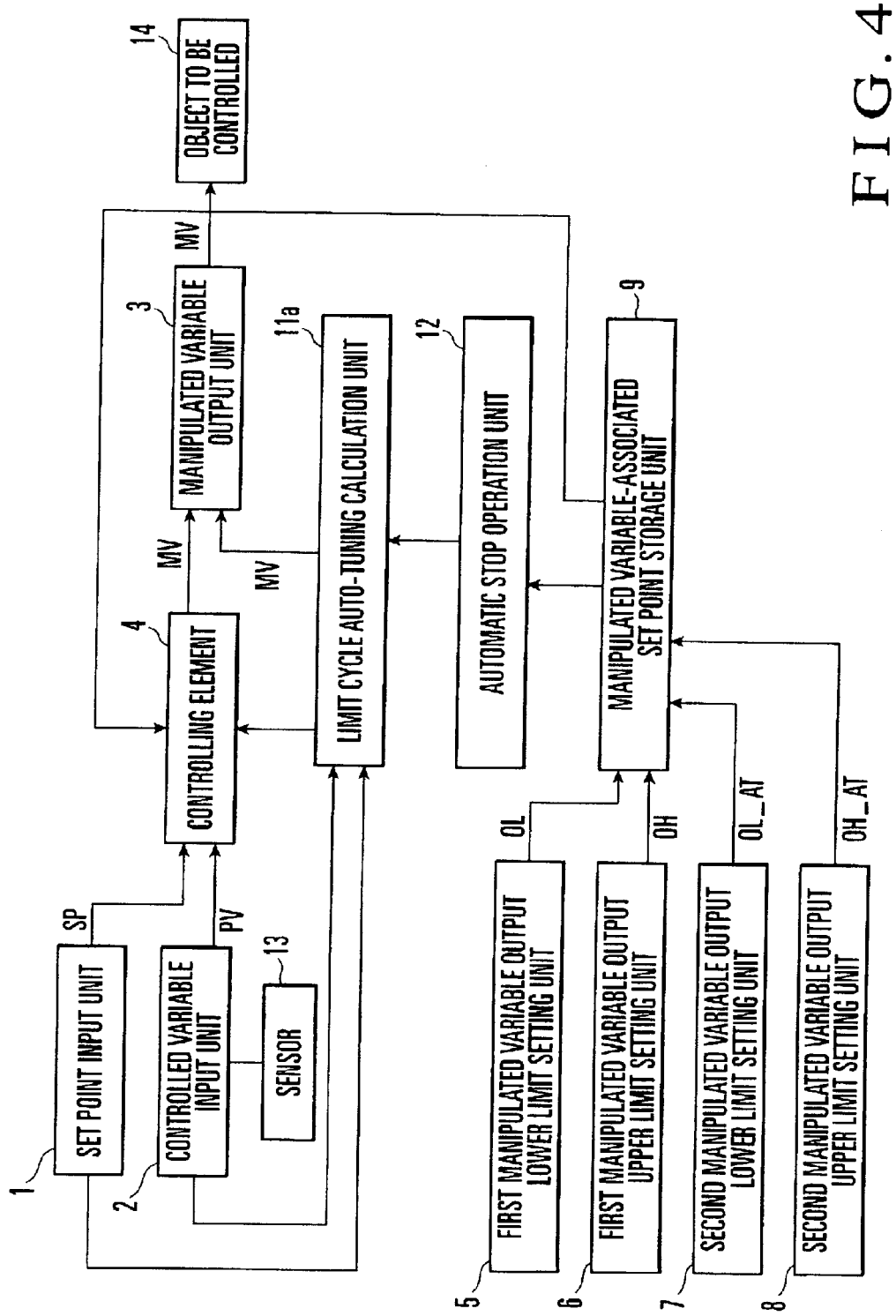
FIG. 4 is a block diagram showing the arrangement of a control apparatus according to the second embodiment of the present invention.

FIG. 4 shows the arrangement of a control apparatus according to the second embodiment of the present invention. The same reference numerals as in FIG. 1 denote the same parts.

The control apparatus according to the second embodiment comprises a set point input unit 1, controlled variable input unit 2, manipulated variable output unit 3, controlling element 4, first manipulated variable output lower limit setting unit 5, first manipulated variable output upper limit setting unit 6, second manipulated variable output lower limit setting unit 7, second manipulated variable output upper limit setting unit 8, and manipulated variable-associated set point storage unit 9.

The control apparatus further comprises an automatic stop operation unit 12 which is connected to the manipulated variable-associated set point storage unit 9, automatically stops auto-tuning in executing limit cycle auto-tuning, and notifies the operator that setting is abnormal, and a limit cycle auto-tuning calculation unit 11a which is connected to the set point input unit 1, controlled variable input unit 2, controlling element 4, manipulated variable output unit 3, and automatic stop operation unit 12 and calculates control parameters.

The automatic stop operation unit 12 refers to set points stored in the manipulated variable-associated set point storage unit 9 in limit cycle auto-tuning. If the second manipulated variable lower limit set point OL_AT is lower than the first manipulated variable lower limit set point OL, or the manipulated variable upper limit set point OH_AT is higher than the first manipulated variable upper limit set point OH, the automatic stop operation unit 12 automatically stops auto-tuning, and notifies the operator that setting is inconsistent.

The limit cycle auto-tuning calculation unit 11a executes a limit cycle auto-tuning processing sequence, outputs the second manipulated variable to an object to be controlled, and calculates the control parameters of the controlling element 4 on the basis of a control response corresponding to the manipulated variable output.

Figure 5:
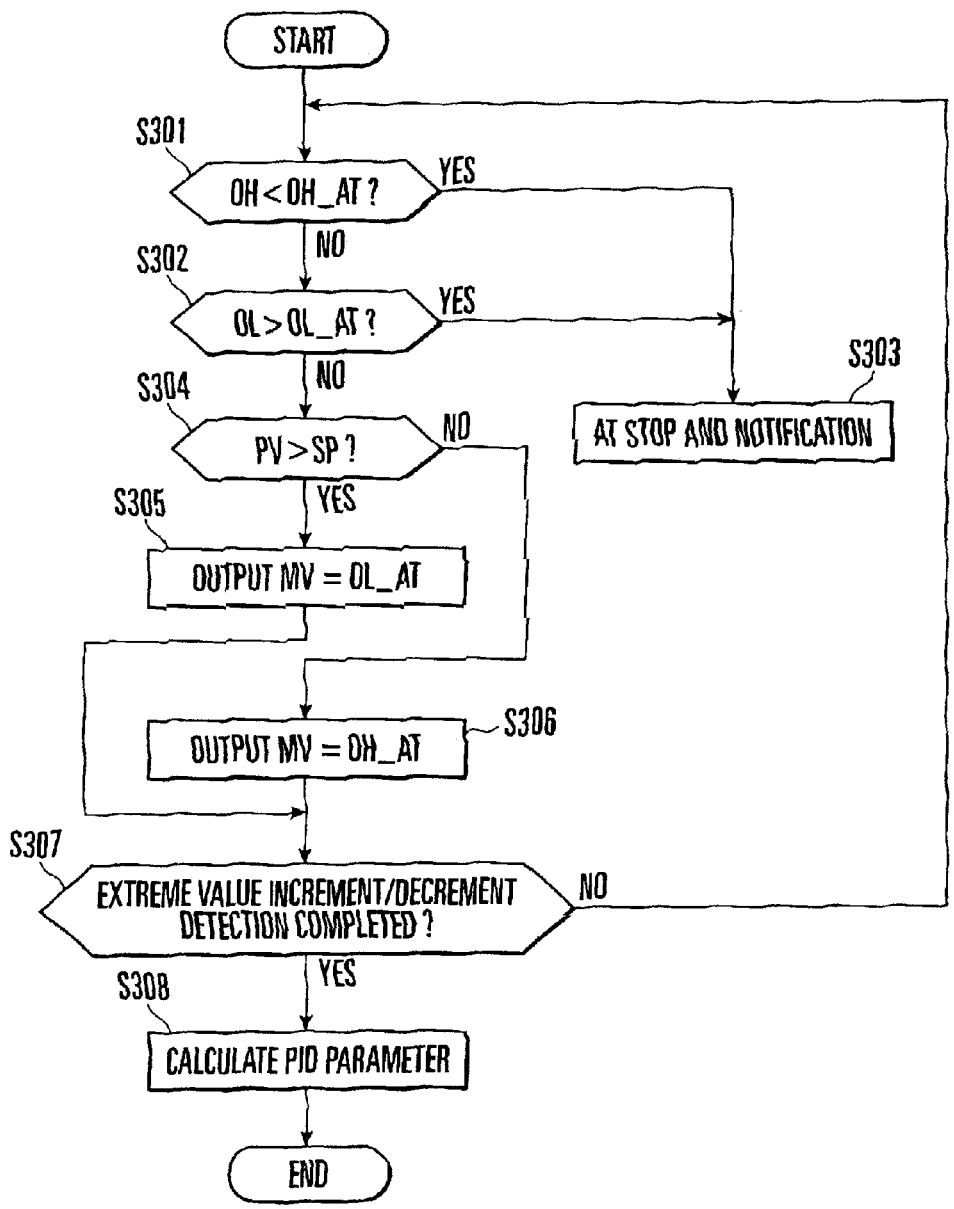
FIG. 5 is a flow chart showing the operation of the control apparatus in FIG. 4 in executing limit cycle auto-tuning.

The limit cycle auto-tuning function of the control apparatus will be described with reference to FIG. 5. The automatic stop operation unit 12 refers to set values stored in the manipulated variable-associated set point storage unit 9. If the first manipulated variable upper limit set point OH is lower than the second manipulated variable upper limit set point OH_AT (YES in step S301), or the first manipulated variable lower limit set point OL is higher than the second manipulated variable lower limit set point OL_AT (YES in step S302), the automatic stop operation unit 12 stops limit cycle auto-tuning, and notifies the operator that setting of at least either the second manipulated variable upper limit set point OH_AT or second manipulated variable lower limit set point OL_AT is inconsistent (step S303).

If the automatic stop operation unit 12 does not stop limit cycle auto-tuning, limit cycle auto-tuning continues. The limit cycle auto-tuning calculation unit 11a compares the controlled variable PV and set point SP (step S304).

If the controlled variable PV is higher than the set point SP as a result of comparison between the controlled variable PV and the set point SP, the limit cycle auto-tuning calculation unit 11a adopts the second manipulated variable lower limit set point OL_AT as the lower limit value of the manipulated variable MV, and outputs the manipulated variable MV=OL_AT to the manipulated variable output unit 3. The manipulated variable output unit 3 outputs the manipulated variable MV to an object to be controlled (step S305).

If the controlled variable PV is equal to or smaller than the set point SP in step S304, the limit cycle auto-tuning calculation unit 11a adopts the second manipulated variable upper limit set point OH_AT as the upper limit value of the manipulated variable MV, and outputs the manipulated variable MV=OH_AT to the manipulated variable output unit 3. The manipulated variable output unit 3 outputs the manipulated variable MV to the object (step S306).

The limit cycle auto-tuning calculation unit 11a performs extreme value increment/decrement detection processing (step S307). Extreme value increment/decrement detection processing is almost the same as that in FIG. 3 except that the limit cycle auto-tuning calculation unit 11a returns from steps S204 and S207 in FIG. 3 not to step S101 but to step S301, and from step S208 in FIG. 3 not to step S109 but to step S308.

After the completion of extreme value increment/decrement detection, the limit cycle auto-tuning calculation unit 11a calculates PID parameters (step S308). That is, the limit cycle auto-tuning calculation unit 11a calculates the proportional band Pb, integral time Ti, and derivative time Td in accordance with equations (4), (8), and (9) described above. The calculated proportional band Pb, integral time Ti, and derivative time Td are set in the controlling element 4.

The operation of the controlling element 4 in normal control at the end of limit cycle auto-tuning is the same as that in the first embodiment.

As described above, according to the second embodiment, the operator can set the second manipulated variable lower limit set point OL_AT and second manipulated variable upper limit set point OH_AT used to execute auto-tuning, separately from the first manipulated variable lower limit set point OL and first manipulated variable upper limit set point OH used during actual control.

When OL>OL_AT or OH<OH_AT, activation of auto-tuning automatically stops to notify the operator that setting is inconsistent, so as to prevent the second manipulated variable in auto-tuning from deviating from the first manipulated variable lower limit set point OL or first manipulated variable upper limit set point OH.

Hence, the second embodiment enables auto-tuning using a proper second manipulated variable, and the operator on site need not frequently change settings. Also, the second manipulated variable in auto-tuning does not deviate from the first manipulated variable lower limit set point OL and first manipulated variable upper limit set point OH serving as the upper and lower limits of the basic manipulated variable.

The control apparatus described in the first and second embodiments can be implemented by a computer having an arithmetic device, storage device, and interface, and a program which controls these hardware resources.

According to the present invention, the control apparatus adopts the first manipulated variable output lower limit setting unit for setting in advance the first manipulated variable lower limit set point which designates the lower limit value of the first manipulated variable output in normal operation, the first manipulated variable output upper limit setting unit for setting in advance the first manipulated variable upper limit set point which designates the upper limit value of the first manipulated variable, the second manipulated variable output lower limit setting unit for setting in advance the second manipulated variable lower limit set point which designates the lower limit value of the second manipulated variable output to an object to be controlled in executing limit cycle auto-tuning, and the second manipulated variable output upper limit setting unit for setting in advance the second manipulated variable upper limit set point which designates the upper limit value of the second manipulated variable.

This arrangement allows the operator to set the second manipulated variable lower limit set point and second manipulated variable upper limit set point used to execute limit cycle auto-tuning, independently of the first manipulated variable lower limit set point and first manipulated variable upper limit set point used in normal control operation.

As a result, the first manipulated variable lower limit set point and first manipulated variable upper limit set point need not be changed in executing auto-tuning. The present invention also eliminates the need for cumbersome setting operation of changing the first manipulated variable lower limit set point and first manipulated variable upper limit set point in executing auto-tuning and resetting them in normal control operation. In resetting the first manipulated variable lower limit set point and first manipulated variable upper limit set point, erroneous setting of them can be avoided. The second manipulated variable lower limit set point and second manipulated variable upper limit set point can be set irrelevantly to the first manipulated variable lower limit set point and first manipulated variable upper limit set point.

The second manipulated variable lower limit set point and second manipulated variable upper limit set point can be set to appropriate values so as to properly execute limit cycle auto-tuning. The time taken to execute limit cycle auto-tuning can be shortened.

The control apparatus further comprises the second manipulated variable control unit which causes the limit cycle auto-tuning calculation unit to employ the first manipulated variable lower limit set point as the second manipulated variable instead of the second manipulated variable lower limit set point when the second manipulated variable lower limit set point is lower than the first manipulated variable lower limit set point, and to employ the first manipulated variable upper limit set point as the upper limit value of the second manipulated variable instead of the second manipulated variable upper limit set point when the second manipulated variable upper limit set point is higher than the first manipulated variable upper limit set point.

As a result, the upper and lower limit values of the second manipulated variable output to an object to be controlled in executing limit cycle auto-tuning can be prevented from deviating from the upper and lower limit values of the first manipulated variable output to the object in normal control operation. Calculation of an improper control parameter can be avoided.

The control apparatus further comprises the automatic stop operation unit which stops execution of limit cycle auto-tuning when the second manipulated variable lower limit set point is lower than the first manipulated variable lower limit set point or the second manipulated variable upper limit set point is higher than the first manipulated variable upper limit set point.

With this arrangement, the upper and lower limit values of the second manipulated variable output to an object to be controlled in executing limit cycle auto-tuning can be prevented from deviating from the upper and lower limit values of the first manipulated variable output to the object in normal control operation. The operator of the control apparatus can set the second manipulated variable lower limit set value and second manipulated variable upper limit set value again. Consequently, calculation of an improper control parameter can be avoided.

The control apparatus also comprises the automatic stop operation unit which notifies the operator that at least either the second manipulated variable lower limit set point or second manipulated variable upper limit set point is inconsistent when the second manipulated variable lower limit set point is lower than the first manipulated variable lower limit set point or the second manipulated variable upper limit set point is higher than the first manipulated variable upper limit set point.

The automatic stop operation unit can make the operator of the control apparatus recognize that at least either the second manipulated variable lower limit set point or second manipulated variable upper limit set point is inconsistent. The automatic stop operation unit can cause the operator to set the second manipulated variable lower limit set point and second manipulated variable upper limit set point again. Calculation of an improper control parameter can, therefore, be avoided.

What is claimed is:

1. A control apparatus comprising:
   manipulated variable output means for outputting first and second manipulated variables having a constant amplitude to an object to be controlled, the first manipulated variable being output to the object in normal operation and the second manipulated variable being output to the object in executing limit cycle auto-tuning;
   arithmetic means for calculating a limit cycle auto-tuning control parameter for adjusting a control parameter to the object on the basis of a control response corresponding to the first and second manipulated variables from said manipulated variable output means;
   first lower limit setting means for setting in advance a first lower limit value representing a lower limit value of the first manipulated variable;
   first upper limit setting means for setting in advance a first upper limit value representing an upper limit value of the first manipulated variable;
   second lower limit setting means for setting in advance a second lower limit value representing a lower limit value of the second manipulated variable;
   second upper limit setting means for setting in advance a second upper limit value representing an upper limit value of the second manipulated variable; and
   controlling means for performing feedback control calculation based on the control parameter for a deviation between a set point and a controlled variable to calculate the first manipulated variable, and outputting the calculated first manipulated variable to the object,
   wherein in executing limit cycle auto-tuning, said arithmetic means outputs to the object the second manipulated variable having the second lower limit value as the lower limit value and the second upper limit value as the upper limit value, calculates the control parameter of said controlling means on the basis of a control response corresponding to the manipulated variable output, and sets the calculated control parameter in said controlling means, further comprising automatic stop operation means for automatically notifying an operator that setting of at least one of the second lower limit value and the second upper limit value is abnormal when the second lower limit value is smaller than the first lower limit value, and the second upper limit value is larger than the first upper limit value in executing limit cycle auto-tuning.

2. A control apparatus comprising:
   manipulated variable output means for outputting first and second manipulated variables having a constant amplitude to an object to be controlled, the first manipulated variable being output to the object in normal operation and the second manipulated variable being output to the object in executing limit cycle auto-tuning;
   arithmetic means for calculating a limit cycle auto-tuning control parameter for adjusting a control parameter to the object on the basis of a control response corresponding to the first and second manipulated variables from said manipulated variable output means;
   first lower limit setting means for setting in advance a first lower limit value representing a lower limit value of the first manipulated variable;
   first upper limit setting means for setting in advance a first upper limit value representing an upper limit value of the first manipulated variable;
   second lower limit setting means for setting in advance a second lower limit value representing a lower limit value of the second manipulated variable;

second upper limit setting means for setting in advance a second upper limit value representing an upper limit value of the second manipulated variable; and controlling means for performing feedback control calculation based on the control parameter for a deviation between a set point and a controlled variable to calculate the first manipulated variable, and outputting the calculated first manipulated variable to the object, wherein in executing limit cycle auto-tuning, said arithmetic means outputs to the object the second manipulated variable having the second lower limit value as the lower limit value and the second upper limit value as the upper limit value, calculates the control parameter of said controlling means on the basis of a control response corresponding to the manipulated variable output, and sets the calculated control parameter in said controlling means, further comprising manipulated variable control means for outputting to said arithmetic means the first lower limit value as the lower limit value of the second manipulated variable when the second lower limit value is smaller than the first lower limit value in executing limit cycle auto-tuning.

3. An apparatus according to claim 2, wherein said manipulated variable control means outputs to said arithmetic means the first upper limit value as the upper limit value of the second manipulated variable when the second upper limit value is larger than the first upper limit value.

4. A control apparatus comprising:

manipulated variable output means for outputting first and second manipulated variables having a constant amplitude to an object to be controlled, the first manipulated variable being output to the object in normal operation and the second manipulated variable being output to the object in executing limit cycle auto-tuning;

arithmetic means for calculating a limit cycle auto-tuning control parameter for adjusting a control parameter to the object on the basis of a control response corresponding to the first and second manipulated variables from said manipulated variable output means;

first lower limit setting means for setting in advance a first lower limit value representing a lower limit value of the first manipulated variable;

first upper limit setting means for setting in advance a first upper limit value representing an upper limit value of the first manipulated variable;

second lower limit setting means for setting in advance a second lower limit value representing a lower limit value of the second manipulated variable;

second upper limit setting means for setting in advance a second upper limit value representing an upper limit value of the second manipulated variable; and controlling means for performing feedback control calculation based on the control parameter for a deviation between a set point and a controlled variable to calculate the first manipulated variable, and outputting the calculated first manipulated variable to the object, wherein in executing limit cycle auto-tuning, said arithmetic means outputs to the object the second manipulated variable having the second lower limit value as the lower limit value and the second upper limit value as the upper limit value, calculates the control parameter of said controlling means on the basis of a control response corresponding to the manipulated variable output, and sets the calculated control parameter in said controlling means, further comprising automatic stop operation means for automatically stopping execution of limit cycle auto-tuning when the second lower limit value is smaller than the first lower limit value in executing limit cycle auto-tuning.

5. An apparatus according to claim 4, wherein said automatic stop operation means automatically stops execution of limit cycle auto-tuning when the second upper limit value is larger than the first upper limit value in executing limit cycle auto-tuning.

6. A control apparatus comprising:

manipulated variable output means for outputting first and second manipulated variables having a constant amplitude to an object to be controlled, the first manipulated variable being output to the object in normal operation and the second manipulated variable being output to the object in executing limit cycle auto-tuning;

arithmetic means for calculating a limit cycle auto-tuning control parameter for adjusting a control parameter to the object on the basis of a control response corresponding to the first and second manipulated variables from said manipulated variable output means;

first lower limit setting means for setting in advance a first lower limit value representing a lower limit value of the first manipulated variable;

first upper limit setting means for setting in advance a first upper limit value representing an upper limit value of the first manipulated variable;

second lower limit setting means for setting in advance a second lower limit value representing a lower limit value of the second manipulated variable;

second upper limit setting means for setting in advance a second upper limit value representing an upper limit value of the second manipulated variable; and controlling means for performing feedback control calculation based on the control parameter for a deviation between a set point and a controlled variable to calculate the first manipulated variable, and outputting the calculated first manipulated variable to the object, wherein in executing limit cycle auto-tuning, said arithmetic means outputs to the object the second manipulated variable having the second lower limit value as the lower limit value and the second upper limit value as the upper limit value, calculates the control parameter of said controlling means on the basis of a control response corresponding to the manipulated variable output, and sets the calculated control parameter in said controlling means, wherein when the first lower limit value is not larger than the second lower limit value and the first upper limit value is not smaller than the second upper limit value, letting Pb be a proportional band, Ti be an integral time, and Td be a derivative time, said arithmetic means calculates control parameters:

$$Pb=250\_Er2-Er1\_/(OH\_AT-OL\_AT)$$

$$Ti=6(Th1+Th2)$$

$$Td=1.2(Th1+Th2).$$

7. An apparatus according to claim 6, wherein when the first lower limit value is larger than the second lower limit value and the first upper limit value is not smaller than the second upper limit value, said arithmetic means calculates the proportional band:

$$Pb=250\_Er2-Er1\_/(OH\_AT-OL).$$

8. An apparatus according to claim 6, wherein when the first lower limit value is not larger than the second lower limit value and the first upper limit value is smaller than the second upper limit value, said arithmetic means calculates the proportional band:

$$Pb=250\_Er2-Er1\_/(OH-OL\_AT).$$

9. An apparatus according to claim 6, wherein when the first lower limit value is larger than the second lower limit value and the first upper limit value is smaller than the second upper limit value, said arithmetic means calculates the proportional band:

$$Pb=250\_Er2-Er1\_/(OH-OL).$$

* * * * *